April 13, 1965  J. L. REEVES  3,178,215
GRAPPLE FOR SUNKEN LOGS
Filed Aug. 20, 1963  2 Sheets-Sheet 1

INVENTOR.
JOHN L. REEVES
BY Mattin & Graybeal
ATTORNEYS

April 13, 1965  J. L. REEVES  3,178,215
GRAPPLE FOR SUNKEN LOGS
Filed Aug. 20, 1963
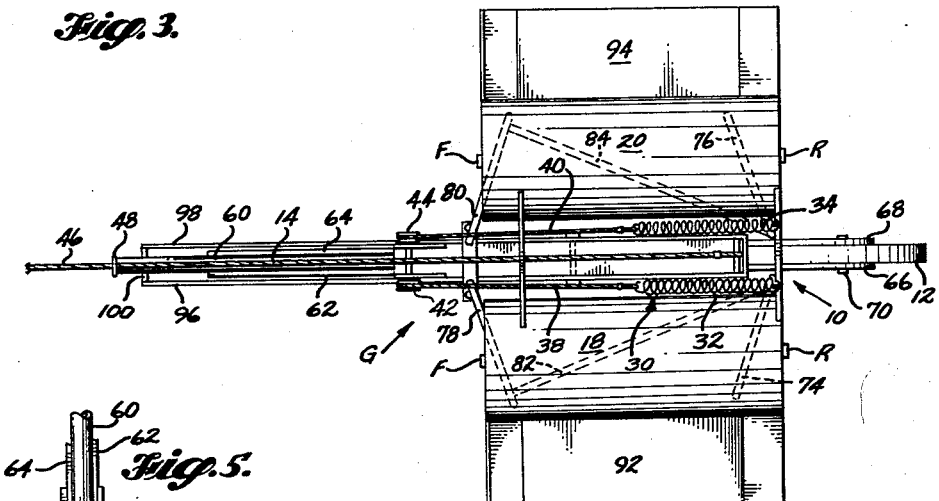
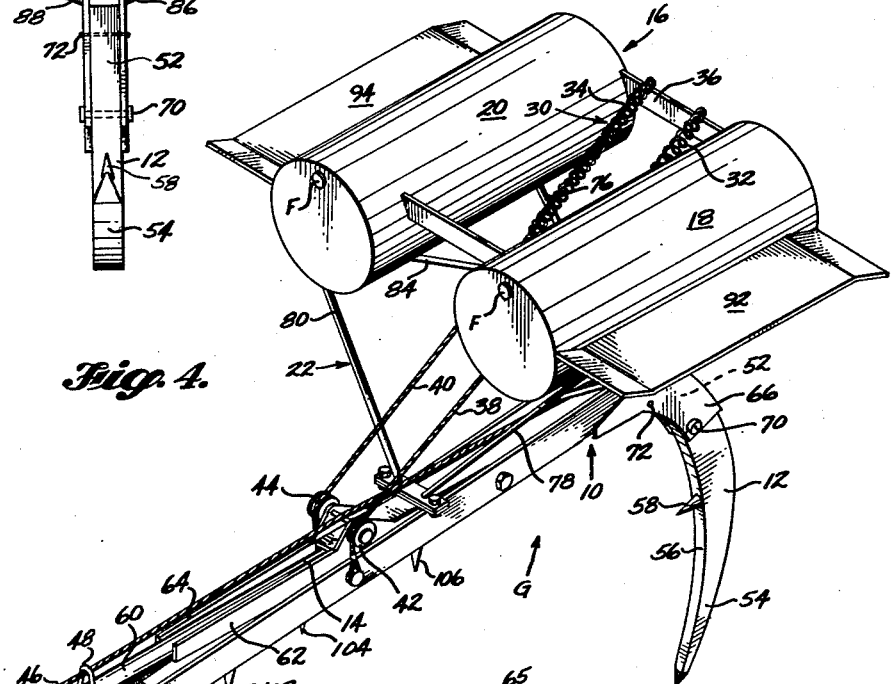
INVENTOR.
JOHN L. REEVES
BY Mattin & Graybeal
ATTORNEYS 3,178,215
GRAPPLE FOR SUNKEN LOGS
John L. Reeves, 301 Newton Ave. N., Minneapolis, Minn.
Filed Aug. 20, 1963, Ser. No. 303,347
16 Claims. (Cl. 294—66)

The present invention relates to grapples, and more particulraly relates to an improved form of grapple especially designed for locating, snagging, and raising sunken logs, or the like, from the bottom of a lake or other body of water.

The grapple of the present invention comprises a hook and buoyancy means for supporting the same in a generally upright position substantially at the bottom of the lake. The hook is towed along the bottom of the lake in this position in quest of sunken logs. A principal object of the present invention is to provide an improved buoyancy means for maintaining the hook substantially upright at or near the bottom of the lake. Briefly stated, the improved buoyancy means comprises a pair of laterally spaced apart air cells located above the hook portion of the grapple and connected to the grapple by means of appropriate frame structure. The said air cells are symmetrically arranged on opposite sides of the hook and are preferably constructed to be over buoyant, i.e., if filled with air alone, the air cells would place the hook in midwater rather than at the bottom of the lake. According to the invention, each air cell is provided with at least one, but preferbaly two normally plugged openings through which ballasting water is either added to or removed from such cell independently of the other cell. According to the preferred form of the invention, the "fill" opening (where water is added) is located near the top of the front end wall of the cell, and the "remove" opening (where water is removed) is located near the bottom of the rear end wall of said cell. In use, the grapple is placed into the water and the depth which it takes in the water is observed. Calculations are then made to determine the amount of ballasting water needed to place the hook at the bottom of the lake, and then such ballasting water is apportioned between the air cells. Such provision of a pair of air cells spaced laterally outboard on opposite sides of the hook lends lateral stability to the hook, preventing it from "flopping" over onto its side. Also, it is sometimes necessary to correct the sideways attitude of the hook in the water, and due to the twin cell arrangement this may be conveniently done by merely reapportioning the ballasting water between the two air cells, i.e., ballasting water is taken from the low side air cell and added to the high side air cell. The grapple of the present invention is in the nature of an improvement on such prior art grapples as the one shown and described in Noble, U.S. Patent No. 3,003,804, issued October 10, 1961.

Another principal object of the present invention is to provide a grapple characterized by a generally J-shaped log-snagging member including an arcuate hook and a generally straight shank extension connected thereto; a log-clamping member pivotally connected to the shank extension and including upper and lower portions; buoyancy means of the type heretofore described attached to and spaced above said log-snagging member; resilient means interconnected between said buoyancy means and the lower portion of said log-clamping arm for normally urging said lower portion against the bottom of the shank extension, with said resilient means comprising a pair of pulley wheels extending out slightly on opposite sides of and above the shank extension forwardly of the pivotal connection, a pair of coil springs or the like attached at their upper ends to said buoyancy means, and a line, such as a cable or the like, interconnected between the lower end of each coil spring and a side of the lower portion of the said log-clamping member, with each such line extending over and being supported by one of said pulley wheels; a towing line receiving eye at the forward end of the shank extension; a towing line extending through said eye; and means connecting the rearward end of said towing line to the upper portion of said log-clamping member.

According to the invention, the resilient means is constructed so that the said coil springs are located wholly above the shank extension, both when the log-clamping member occupies its log-clamping position, and the said coil springs are extended, and when the log-clamping member occupies an open position, and the said coil springs are retracted. This arrangement always places the shank extension of the log-snagging member between the coil springs and sunken objects located below the grapple where it can function as a guard for the coil springs. The coil springs are additionally protected by being located between the air cells at which location they are substantially surrounded by the said air cells or by elements of the supporting frame for the same.

According to the invention, the shank extension also functions as a guard for the pulley wheels, which wheels are mounted slightly above said shank extension.

Further objects, features and advantages of the present invention include the provision of a grapple for use in recovering sunken logs, wherein:

(A) The arcuate hook has a curved shank portion as well as a curved point portion and has a generally uniform thickness throughout, but decreases gradually in depth from the shank portion, which is relatively deep, to the point portion, which has relatively little depth, with the concave edge surface of the hook being provided with a single inwardly projecting tooth for penetrating into and gripping the snagged log;

(B) The shank extension is of what may be termed a "box" construction in that it is composited from an elongated tubular element surrounded on the sides and top by bar-like pieces of plate steel, such construction providing sufficient section or material depth in the direction of the bending forces to prevent substantial bending from occurring;

(C) A pair of arcuate splice plates are rigidly attached at their respective forward ends to the after end of the shank extension, as by welding, for example, and the arcuate shank portion of the hook is disposed between the after ends of said splice plates, with a husky pin extending between aligned openings in said splice plates and in the hook shank substantially below the line of pull, and with one or more shear pins extending through additional aligned openings in said splice plates and in the hook shank at a location or locations offset forwardly from and above the pin connection, said shear pins preventing rotation of the hook about the pin unless an extremely heavy or removable object is encountered by the hook, causing such shear pins to shear;

(D) The log-clamping member or arm is of what may be termed an "open box" construction, in that it is composited from a pair of straight and generally parallel metal bars located on opposite sides of the shank extension, with a pin extending through aligned openings in said metal bars intermediate their length, and in the shank extension intermediate its length, to form a pivotal connection, with a metal rod or the like interconnected between the upper ends of said metal bars and forming means to which the towing line is attached, and with an enlarged tooth element extending between and connecting together the lower ends of said metal bars, such "open box" construction permitting partial "nesting" of the shank extension within the log-clamping arm when said arm occupies its open position; and (E) A planing fin extends generally laterally outboard from each of the air cells, with each such planing fin consisting of a relatively wide, thin plate member, flat and straight throughout the greater portion of its length, and preferably turned up at its front end and down at its rear end, with each such fin being welded to the adjacent air cell by means of a bead of welding extending only at a midportion of the fin in the straight section thereof, such arrangement making possible the cold (without heating by a torch or the like) adjustment of the forward and rearward angling portions, for the purpose of changing the sideways attitude of the grapple in the water, for example.

These and other objects, features, advantages and characteristics of the present invention will be apparent from the following typical and therefore non-limitative embodiments of the invention as set forth below, in conjunction with the accompanying illustrations thereof, wherein like letters and numerals refer to like parts, and wherein:

FIG. 3 is a top plan view of the grapple, such view illustrating the lateral spacing of the air cells with the coil springs disposed in the inner space formed therebetween, such view also illustrating the stabilizing fins which connect to and extend outboard from said air cells;

FIG. 4 is a perspective view of the grapple in its operative position;

Figure 2:
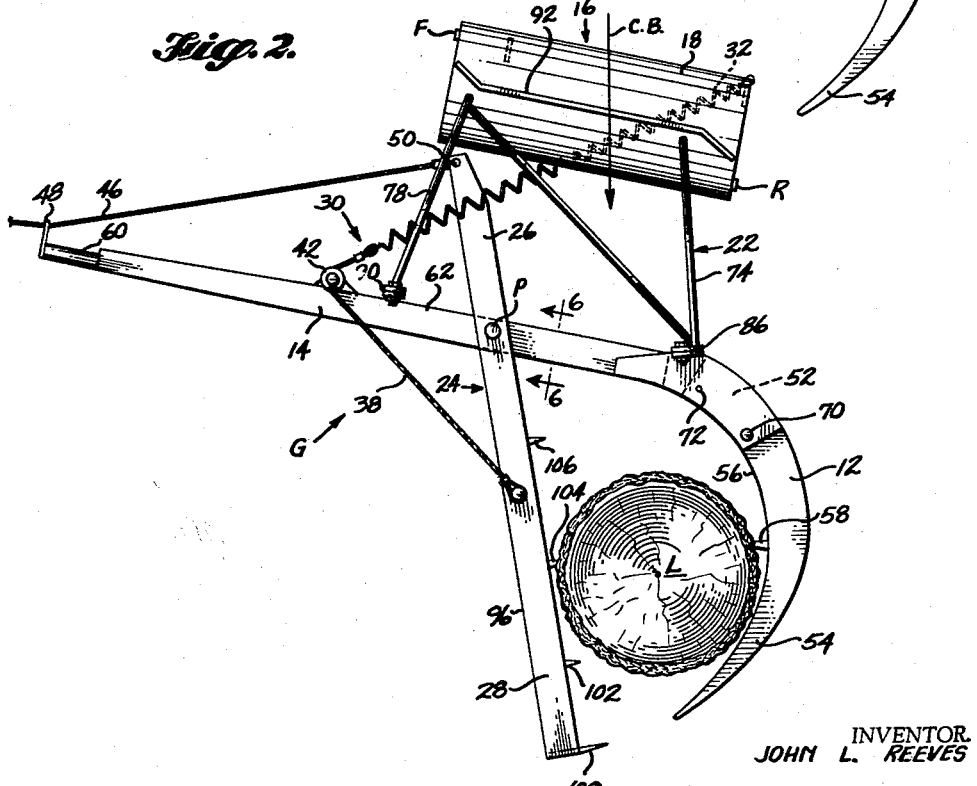
FIG. 2 is a view taken from the same aspect as FIG. 1, but showing a log firmly gripped between the hook and the lower portion of the log-clamping member.

FIG. 5 is a fragmentary bottom plan view looking toward the region wherein the shank portion of the hook is connected to the after end portion of the shank extension by means of a pair of splice plates, such view also showing mounting flanges or ears extending from said splice plates to which the rear legs of the frame means are attached; and FIG. 6 is a cross-sectional view of the shank extension taken substantially along line 6—6 of FIG. 2.

Referring now to the several figures of the drawings, and to FIGS. 1 and 2 in particular, the grapple G is shown as including a generally J-shaped log-snagging member 10 having a hook portion 12 and a straight portion 14, hereinafter referred to as the shank extension. Buoyancy means 16, preferably comprising a pair of laterally spaced air cells 18, 20, is situated above the log-snagging member 10 and is connected thereto by suitable frame means 22, hereinafter to be described more specifically. A generally straight log-clamping member or arm 24 is pivotally connected at a point intermediate its length to a point intermediate the length of the shank extension 14, said arrangement providing an upper portion 26 and a lower arm portion 28. A pair of coil springs 32, 34 are attached at their upper ends to a frame element 36 extending between and tying together the buoyant bodies 18, 20. Line means 38, 40 interconnect between the respective lower ends of said coil springs 32, 34 and opposite sides of the lower arm portion 28. The line means 38, 40 extend over guide means illustrated in the form of rollers or pulleys 42, 44, and are suitably attached to the upper surface of the shank extension 14.

A towing line or cable 46 extends from a barge or other vessel (not shown), located at the surface of the water, through a ring-like eye 48 situated at the forward end of the shank extension 14 and is connected to a metal rod or bar 50 at the end of the upper portion 26 of the log-clamping member 24.

The hook 12 is of arcuate configuration and has a curved shank portion 52 as well as a curved point portion 54. Hook 12 is of generally uniform thickness throughout but decreases gradually in depth from the shank portion 52, which is relatively deep, to the point portion 54, which has relatively little depth. The concave inner edge 56 of the hook 12 is provided with a single inwardly projecting tooth 58 constructed to penetrate the outer surface of the snagged log L, as will hereinafter be explained in more detail in connection with a discussion of the mode of operation of the grapple G.

The shank extension 14 is composited from a tubular element 60 and a pair of side members 62, 64 extending contiguous the sides thereof and welded thereto. The side members 62, 64 are generally parallel to each other and to the plane of hook 12, placing the greater section (i.e., the depth which is substantially greater in magnitude than the width) of each such side member in the plane in which bending tends to occur. As perhaps best shown in FIG. 6, a top plate 65 bridges the space between the side members 62, 64 and adds structural rigidity to the assembly of elements that together compose the shank extension.

A pair of splice plates 66, 68 are welded or otherwise rigidly attached to the said after end of the shank extension 14. The shank portion 62 of hook 12 is sandwiched between the after portions of the splice plate 66, 68 and a transverse pin element, such as the bolt 70, extends laterally through aligned openings provided in said splice plate 66, 68, and in the shank portion 52. The pin element 70 mounts the hook 12 for pivotal movement relative to the splice plate and shank extension assembly, but pivotal movement is normally prevented by one or more shear pins 72, situated in additional set or sets of aligned openings extending through the splice plates 66, 68 and the hook shank 52. As shown in FIG. 2, for example, the splice plates 66, 68 are of arcuate configuration so as to conform to the curvature of the shank portion 52 with the shear pin (or pins) 72 serving to normally maintain the hook shank 52 in proper alignment with respect to the splice plates 66, 68. As clearly shown in FIG. 2, for example, the main pin 70 is substantially offset below the shear pin (or pins) 70 so as to create moment arms on both sides of main pin 70 that extend generally crosswise with respect to the shank extension 14 and generally normal to both the load force acting on the hook and the shearing force acting on the shear pin (or pins) 72.

According to the invention, normally plugged fill openings F are located near the tops of the front end walls of air cells 18, 20 and normally plugged water removal of drain openings R are located near the bottoms of the rear end walls of such air cells 18, 20. Preferably the air cells 18, 20 are constructed to be at least slightly overbuoyant so that if filled with air alone, they would support the grapple G in mid-water, somewhere above the bottom. The grapple is then ballasted to the desired depth, i.e., at or near the bottom, by the addition of ballasting water through the fill openings F into the air cells 18, 20, increasing the grapple's weight. The ballasting water is initially evenly apportioned between the air cells 18, 20 so as to maintain a balance in the buoyant forces and maintain the hook 12 in a substantially upright or vertical position. If at a later time it is necessary to correct the sideways attitude in the water, such is easily done by merely reapportioning the ballasting water between the air cells 18, 20. That is to say, ballasting water is removed from the low side air cell through its removal opening R and added to the high side air cell through the fill opening F.

As an alternate arrangement, instead of ballasting by adding water to the air cells 18, 20, as previously described, ballasting weights could be suitably attached to the air cells 18, 20, or to portions of their support structure 22.

Frame structure 22 is shown as including rear leg members 74, 76, forward leg members 78, 80 and cross members or braces 82, 84. The rear leg members 74, 76 are interconnected between outboard portions of the buoyant bodies 18, 20 and anchor plates or ears 86, 88, extending laterally outboard from the splice plates 66, 68. As is obvious from an inspection of FIGS. 2 and 5, for example, the rear leg members 74, 76 connect to the anchor plates 86, 88 on the hook side of the pivot point P. The forward leg members 78, 80 are shown interconnected between outboard portion points on said buoyant bodies 18, 20 and a laterally extending anchor plate 90 welded or otherwise suitably fastened to the upper surface of the shank extension 14 forwardly of pivot point P. The center of buoyancy, designated C/B is located on the hook or rearward side of pivot point P, and serves to orient the log-snagging member 10 substantially in the position shown in FIG. 1.

A pair of planing fins 92, 94 extend outboard of the air cells 18, 20 and contribute to the lateral stability of the grapple G. As shown in FIG. 4 in connection with fin 92, the mid portions of the fins 92, 94 are welded to the adjoining air cell, but the leading and trailing portions are not, leaving them free to be bent and arranged at an angle to the generally straight mid portion. The leading portions of the fins 92, 94 are shown turned up while the trailing portions thereof are turned down. The forwardly inclining leading surfaces presented by the fins 92, 94 cause such fins 92, 94 to plane in the water, and by adjusting the angle or degree of inclination of one fin independently of the other fin, the sideways attitude of the hook 12 can be corrected. In some installations the planing fins 92, 94 may be omitted and the sideways attitude of the hook be determined by apportioning the ballasting water between the air cells 18, 20, as heretofore discussed.

The log-clamping arm 24 is constructed from a pair of straight and generally parallel metal bars 96, 98 extending on opposite sides of the shank extension 14. Above the pivot point P the metal bars 96, 98 are interconnected by means of the transverse rod 50 to which the towing line 46 is attached. Below the pivot point P the said metal bars 96, 98 are interconnected by means of an enlarged tooth 100. Additional teeth 102, 104, 106 project from the log-engaging surfaces of the metal bars 96, 98, preferably in alternating fashion, i.e., teeth 102 and 106 project from bar 98 and tooth 104 projects from bar 96, for example. Of course, it is to be understood that the number of points and their arrangement can vary in accordance with the requirements of a given installation.

Figure 1:
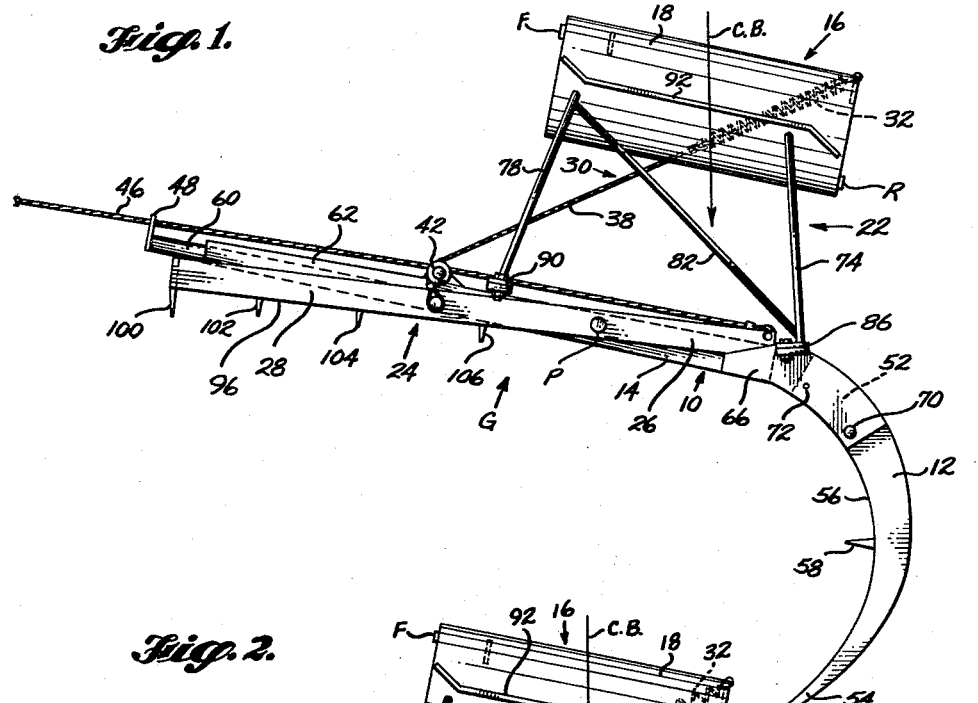
FIG. 1 is a side elevational view of the grapple of the present invention in the position which it assumes while being towed through the water in quest of sunken logs, i.e., in its log-snagging position.

As is most clearly shown in FIGS. 1 and 4, when the log-clamping arm is in what may be termed its open position, a substantial portion of the shank extension 14 on both sides of the pivot point P is "nested" within the inner space formed between the bars 96, 98.

As best shown in FIG. 2, the coil springs 32, 34 and the line means 38, 40 are of such lengths that the coil springs 32, 34 are at all times located above the shank extension 14, including when the log-clamping arm 24 is in its log-clamping position and the said coil springs 32, 34 are extended.

In operation, hook 12, supported in a substantially upright position by the buoyancy means 16 (FIG. 1) and the log-snagging member 10, is towed along the bottom of the lake with the point portion 54 of said hook 12 positioned to snag any log encountered thereby. The pulling force necessary for towing the hook across the bottom of the lake or other body of water is normally insufficient to overcome the tension exerted by the coil springs 32, 34 holding the lower portion of the log-clamping arm 24 in open position against the bottom of the shank extension 14. When the hook 12 engages a log, increased pulling tension upon the upper end of cable 46 pivots the upper portion 26 of the log-clamping arm 24 in a forward direction and pivots the lower end 28 thereof in a rearward direction, thereby stretching the coil springs 32, 34 and engaging the sunken log L between the clamping arm and hook 12, perhaps with tooth 58 and one or more of the teeth 102, 104, 106 piercing the surface of such log L. Further increased dragging force exerted upon the towing line 46 forces the teeth into the log L to tightly grip the same. The log L is then brought to the surface by reeling in the towing line 46 on a winch or other appropriate means disposed upon the barge or raft from which the salvaging operation is conducted.

The provision of but a single tooth 58 permits the snagged log to pivot and change position relative to the hook 12. This is a particularly advantageous feature when a log is to be snaked out from a pile of logs. In this respect, the log L shown in FIG. 2 engaged between teeth 58 and 104 is free to pivot slightly about a line extending axially between such teeth 58, 104.

When the hook 12 snags a large rock or other extremely heavy or immovable object, the pulling force on the towing line 46 is increased until the shear pin (or pins) 72 is broken. Additional pulling force on the towing line 46 pivots the hook 12 about pivot pin 70, allowing the hook to slide up and over the immovable object.

From the foregoing description of constructional features and modes of operation of the grapple of the invention, further forms, arrangements, alternatives and adaptations as to component details, layout and modes of operation for practicing the invention will occur to those skilled in the art to which the invention is addressed, within the scope of the following claims.

What is claimed is:

1. A grapple for use in raising sunken logs from the bottom of a lake or other body of water, said grapple comprising:
   (a) a log-snagging member having a hook portion and a generally straight portion extending forwardly of said hook portion;
   (b) a log-clamping arm pivotally connected at a point intermediate its length to the generally straight portion of the log-snagging member at a point intermediate its length;
   (c) line-supporting means located on said straight portion of the log-snagging member at a location spaced forwardly of the pivotal connection;
   (d) spring means located above said log-snagging member on the hook side of said pivotal connection;
   (e) frame means rigidly anchoring said spring means to the log-snagging member;
   (f) line means extending from said spring means over said line-supporting means to an anchor point on the lower portion of said log-clamping arm; and
   (g) towing line means connected to the upper portion of said log-snagging arm and extending forwardly thereof for towing the grapple.

2. A grapple according to claim 1, wherein the said line-supporting means is located above the generally straight portion of the log-snagging member, placing said generally straight portion of the log-snagging member between the said line-supporting means and sunken objects in the path of travel of the grapple, whereby such straight portion functions as a guard for the line-supporting means.

3. A grapple according to claim 1, wherein the spring means and the line means are of such length that the said spring means is wholly located above the shank extension when the lower portion of the log-clamping arm is swung toward the hook and the said spring means is extended, such arrangement placing the generally straight portion of the log-snagging member between the said spring means and sunken objects below the grapple to function as a guard for said spring means.

4. A grapple for use in raising sunken logs from the bottom of a lake of other body of water, said grapple comprising:
   (a) a log-snagging member having a hook portion and a shank extension extending forwardly of said hook portion;
   (b) a log-clamping arm pivotally connected at a point intermediate its length to said shank extension at a point intermediate its length;
(c) towing line means extending forwardly from the portion of said log-clamping arm located above the pivot point;
(d) buoyancy means situated above said log-snagging member and connected thereto by means of a frame having first leg means interconnected between said buoyancy means and a location on said log-snagging member to the hook side of the pivot point and a second leg means interconnected between said buoyancy means and a location on said log-snagging member on the side of the pivot point opposite from said hook said buoyancy means comprising a pair of laterally spaced air cells symmetrically related on opposite sides of the log-snagging member, with the buoyancy means being constructed so as to place the center of buoyancy thereof on the hook side of said pivot point; and
(e) means normally urging said log-clamping arm against the undersurface of said shank extension.

5. A grapple for use in raising sunken logs from the bottom of a lake or other body of water, said grapple comprising:
(a) a log-snagging member having a hook portion and a shank extension extending forwardly of said hook portion;
(b) a log-clamping arm pivotally connected at a point intermediate its length to said shank extension at a point intermediate its length;
(c) towing line means extending forwardly from the portion of said log-clamping arm located above the pivot point;
(d) buoyancy means situated above said log-snagging member and connected thereto by means of a frame having first leg means interconnected between said buoyancy means and a location on said log-snagging member, to the hook side of the pivot point, and a second leg means interconnected between said buoyancy means and a location on said log-snagging member on the side of the pivot point opposite from said hook, with the buoyancy means being constructed so as to place the center of buoyancy thereof on the hook side of said pivot point; and
(e) means normally urging said log-clamping arm against the under surface of said shank extension, said means comprising:
(1) spring means located wholly above the said shank extension and connected to a portion of the frame means for the buoyancy means,
(2) line means interconnected between said spring means and an intermediate point on the lower portion of said log-clampping arm; and
(3) line supporting means located on the shank extension and over which the said line means extend.

6. A grapple according to claim 5, wherein the said line supporting means is located above the shank extension so as to place the shank extension between it and objects in the water below the grapple so that the shank extension functions as a guard for the line-supporting means.

7. A grapple comprising:
(a) a generally J-shaped log-snagging member composed of an arcuate hook and a generally straight shank extension connected thereto;
(b) a log-clamping member pivotally attached to the shank extension and including upper and lower portions;
(c) buoyancy means attached to and spaced above said log-snagging member;
(d) resilient means interconnected between said buoyancy means and the lower portion of said log clamping member for normally urging said lower portion into a position where it extends adjacent the shank extension, said resilient means comprising:
(1) guide means on said shank extension,
(2) spring means attached to said buoyancy means, and
(3) line means interconnected between said spring means and the lower portion of said log-clamping member, said line means angling around the guide means;
(e) towing line receiving eye at the forward end of the shank extension;
(f) towing line means extending through said eye; and
(g) means connecting said towing line means to the upper portion of said log-clamping member.

8. A grapple according to claim 7, wherein the resilient means is constructed so that the spring means is wholly located above the shank extension when the log-clamping member occupies its log-clamping position and the said spring means is extended.

9. A grapple according to claim 7, wherein the buoyancy means consists of a pair of laterally spaced apart buoyant bodies, providing a laterally stable buoyant action, and maintaining the hook in a generally vertical plane as it is towed in the water.

10. Grapple according to claim 9, wherein the center of buoyancy of said buoyancy means extends to the hook side of the point of pivotal connection of said log-clamping member onto said log-snagging member.

11. A grapple according to claim 9, wherein the said spring means is disposed between the buoyant bodies.

12. A grapple comprising:
(a) a log-snagging member comprising:
(1) an arcuate hook having shank and point portions,
(2) a shank extension, and
(3) splice plate means interconnecting between the hook shank and the shank extension;
(b) a log-clamping arm having upper and lower portions, said log-clamping arm comprising a pair of generally straight and parallel side members disposed on opposite sides of said shank extension;
(c) a pin element extending laterally through aligned openings in said side members and in said shank extensions;
(d) means normally urging the said lower portion of the log-clamping arm substantially against the underside of said shank extension, with the shank extention partially nested within and between the said side members of the log-clamping arm;
(e) means connected to the upper portion of said log-clamping arm for towing the grapple and moving the lower portion of said log-clamping arm toward the hook when a log is snagged;
(f) buoyancy means connected to the upper portion of the grapple, for holding the hook in upstanding relation during the towing operation, with the center of buoyancy of the buoyancy means being disposed between the said pin element and the hook;
(g) anchor plates extending outwardly from the splice plate means; and
(h) frame members interconnecting between said anchor plates and the buoyancy means.

13. A grapple comprising:
(a) a log-snagging member comprising:
(1) an arcuate hook having shank and point portions,
(2) a shank extension, and
(3) splice plate means interconnecting between the hook shank and the shank extension;
(b) a log-clamping arm having upper and lower portions, said log-clamping arm comprising a pair of generally straight and parallel side members disposed on opposite sides of said shank extension;
(c) a pin element extending laterally through aligned openings in said side members and in said shank extension;

(d) means normally urging the said lower portion of the log-clamping arm substantially against the underside of said shank extension, with the shank extension partially nested within the log-clamping arm, said means comprising:

(1) a spring located wholly above the said shank extension, both when relaxed and when extended, (2) line means interconnecting between said spring means and the lower portion of said log-clamping arm, and (3) guide means on the shank extension for supporting and guiding the said line means;

(e) means connected to the upper portion of said log-clamping arm for towing the grapple and moving the lower portion of said log-clamping arm toward the hook when a log is snagged;

(f) buoyancy means connected to the upper portion of the grapple and constructed to hold the hook in upstanding relation during the towing operation, with the center of buoyancy of the buoyancy means being disposed between the pin element and the hook;

(g) anchor plates extending outwardly from the splice plate means; and (h) frame members interconnecting between said anchor plates and the buoyancy means.

14. A grapple according to claim 13, wherein the buoyancy means comprises a pair of laterally spaced apart buoyant bodies and the spring means is disposed between said buoyant bodies.

15. A grapple for use in raising sunken logs or the like from the bottom of a lake or other body of water, said grapple comprising:

(a) a log-snagging means including a hook;

(b) means for towing the log-snagging means in the water; and (c) means buoying the said hook in a predetermined position in the water, said buoying means comprising a pair of laterally spaced apart air cells symmetrically related on opposite sides of the said log-snagging means, each of said cells having at least one opening therein normally closed by a plug and through which water can be added to or removed from the cell independently of the other cell for adjusting the attitude of the hook in the water.

16. A grapple according to claim 15, wherein the said air cells are constructed to be overly buoyant and are ballasted by water contained therein to a desired predetermined depth in the water.

References Cited by the Examiner
UNITED STATES PATENTS

| | | | |
|---|---|---|---|
| 1,165,893 | 12/15 | Munn | 294—66 |
| 2,605,129 | 7/52 | Rooker | 294—66 |
| 3,003,804 | 10/61 | Noble | 294—66 |

SAMUEL F. COLEMAN, *Primary Examiner.*

ERNEST A. FALLER, JR., *Examiner.*